(12) United States Patent
Wettermark

(10) Patent No.: US 11,981,091 B2
(45) Date of Patent: May 14, 2024

(54) PROCESS FOR MANUFACTURING COMPOSITE FIBER PRODUCTS

(71) Applicant: Composite Design Sweden AB, Arlöv (SE)

(72) Inventor: Fredrik Wettermark, Limhamn (SE)

(73) Assignee: EOVIDAR AB, Arlov (SE)

( * ) Notice: Subject to any disclaimer, the term of this patent is extended or adjusted under 35 U.S.C. 154(b) by 827 days.

(21) Appl. No.: 16/976,209

(22) PCT Filed: Feb. 12, 2019

(86) PCT No.: PCT/SE2019/050119
§ 371 (c)(1),
(2) Date: Aug. 27, 2020

(87) PCT Pub. No.: WO2019/168454
PCT Pub. Date: Sep. 6, 2019

(65) Prior Publication Data
US 2021/0001574 A1 Jan. 7, 2021

(30) Foreign Application Priority Data
Feb. 27, 2018 (SE) .................... 1850221-1

(51) Int. Cl.
*B29C 70/46* (2006.01)
*B29C 70/30* (2006.01)
(Continued)

(52) U.S. Cl.
CPC .............. *B29C 70/46* (2013.01); *B29C 70/30* (2013.01); *B29C 70/462* (2013.01); *B29C 70/68* (2013.01);
(Continued)

(58) Field of Classification Search
CPC ....... B29C 70/46; B29C 70/30; B29C 70/462; B29C 70/68; B29C 70/72; B29C 70/78;
(Continued)

(56) References Cited

U.S. PATENT DOCUMENTS

2013/0174969 A1  7/2013  Karb et al.
2014/0083606 A1  3/2014  Masini et al.
(Continued)

FOREIGN PATENT DOCUMENTS

CN  101254652 B  4/2010
DE  102007054087 A1  3/2009
(Continued)

OTHER PUBLICATIONS

Mineral Seal Corporation, Why is Ceramic fiber Heat Resistant?, accessed online Jul. 14, 2023.*
(Continued)

*Primary Examiner* — Camie S Thompson
(74) *Attorney, Agent, or Firm* — Tucker Ellis LLP

(57) ABSTRACT

A method for producing a product including a composite fiber part and a second part, wherein the second part includes a carrier part, wherein the carrier part is a replica of a press tool configured to be heated and to apply a pressure, the method including applying, in a non-cured state, the composite fiber part on the carrier part, arranging the carrier part including the composite fiber part on the press tool, curing the composite fiber part on the carrier part, and removing the product from the press tool, wherein after removal from the press tool the composite fiber part and the carrier part constitutes together at least a part of the finished product. Also disclosed is a composite fiber product including a composite fiber part and a second part.

9 Claims, 2 Drawing Sheets

(51) Int. Cl.
- B29C 70/68 (2006.01)
- B29L 31/30 (2006.01)
- B29L 31/32 (2006.01)
- B60B 5/02 (2006.01)
- B60B 7/00 (2006.01)
- B60B 21/00 (2006.01)
- B60J 5/04 (2006.01)

(52) U.S. Cl.
CPC ......... *B60B 5/02* (2013.01); *B29L 2031/3041* (2013.01); *B29L 2031/32* (2013.01); *B60B 7/0013* (2013.01); *B60B 21/00* (2013.01); *B60B 2310/314* (2013.01); *B60B 2310/52* (2013.01); *B60B 2360/3412* (2013.01); *B60B 2360/3416* (2013.01); *B60B 2360/3418* (2013.01); *B60B 2900/113* (2013.01); *B60B 2900/115* (2013.01); *B60J 5/0413* (2013.01)

(58) Field of Classification Search
CPC ..... B29C 70/682; B29C 70/681; B29C 70/32; B60B 5/02; B60B 7/0013; B60B 21/00; B60B 2310/314; B60B 2310/52; B60B 2360/3416; B60B 2360/3418; B60B 2360/3412; B60B 2900/113; B60B 2900/115; B60B 5/0413; B29L 2031/32; B29L 2031/3041; B60J 5/0413
USPC ........................................................ 442/181
See application file for complete search history.

(56) References Cited

U.S. PATENT DOCUMENTS

| | | |
|---|---|---|
| 2015/0283730 A1 | 10/2015 | Kakimoto |
| 2017/0313002 A1 | 11/2017 | Huang |

FOREIGN PATENT DOCUMENTS

| | | |
|---|---|---|
| EP | 0097279 A2 | 1/1984 |
| JP | 2006192886 A | 7/2006 |
| JP | 2013010346 A | 1/2013 |
| WO | 2016139021 A1 | 9/2016 |

OTHER PUBLICATIONS

International Search Report and Written Opinion for corresponding International Application No. PCT/SE2019/050119, dated Apr. 18, 2019, 16 pages.

Supplementary European Search Report from corresponding European Application No. 19760372, dated Mar. 10, 2022, 10 pages.

Communication Pursuant to Rule 114(2) EPC from corresponding European Patent Application No. 19760372.3, mailed Mar. 12, 2024, 5 pages.

European Patent Office, "Information about non-relevance of third party observations," from corresponding European Patent Application No. 19760372.3 and downloaded from <<https://register.epo.org/application?number=EP19760372&lng=en&tab=doclist>>, dated Apr. 3, 2024, 2 pages.

* cited by examiner

PROCESS FOR MANUFACTURING COMPOSITE FIBER PRODUCTS

TECHNICAL FIELD

The present invention relates generally to the field of composite materials, more specifically it relates to forming of composite fiber products or products comprising composite fibers.

BACKGROUND

Manufacturing composites at industrial standards is a particularly demanding, highly complex process. In comparison to metals and metal alloys used for parts, production can simply be molten and cooled off inside molds to create a desired component. However, fiber-reinforced composite elements need to be combined and prepared before the layup procedures and final curing can even begin.

The use of pre-molds can speed up the manufacturing process for composite fiber products. Typically, the composite fiber material is applied into a pre-form that is then arranged on a press tool in order to be heated and pressed. After curing the composite fibers are removed from the pre-mold, which can be used again. The cured composite fibers will have the shape of the mold and can then be trimmed and drilled on its way to a final product.

However, there still exist a need to improve and further speed up the manufacturing process as well as speeding up and simplifying the assembly process of a final product comprising composite fiber elements.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

Furthermore, it is to be noted that the terms composite fiber(s) and composite fiber or composite fiber part may be used interchangeably in this disclosure if not explicitly stated otherwise.

It is an object of some embodiments to mitigate at least some of the above disadvantages and to provide a method for producing a product comprising a composite fiber part and a second part, as well as a product comprising a composite fiber part and a second part.

According to a first aspect, this is achieved by a method for producing a product comprising a composite fiber part and a second part. The second part comprises a carrier part, wherein the carrier part is a replica of a press tool configured to be heated and to apply a pressure. The method comprises the steps of: applying, in a non-cured state, the composite fiber part on the carrier part; arranging the carrier part comprising the composite fiber part on the press tool; curing the composite fiber part on the carrier part; and removing the product from the press tool, wherein after removal from the press tool the composite fiber part and the carrier part constitutes together at least a part of a finished product. The carrier part is used as a pre-mold part, however the carrier part will be a part of the finished product and not removed in comparison to a pre-mold part.

According to an aspect, the composite fiber part is fixedly connected to the carrier part after curing.

According to an aspect the composite fiber part comprise one or more of a glass fiber, a carbon fiber, an aramid fiber, a basalt fiber, a natural fiber, an organic material or non-organic material. According to an aspect the composite fiber part comprises a resin/matrix.

According to an aspect the step of applying comprises applying one or more layers of composite fibers on the carrier part to build up the composite fiber part on the carrier part.

According to an aspect the step of curing comprises applying, via interaction of the press tool and the carrier part, heat and pressure to the composite fiber part.

According to an aspect, following the curing process, the composite fibers cannot be removed from the carrier without damage being caused to the fibers such as breaking or tearing.

According to an aspect the method may further comprise applying the composite fibers to the carrier part automatically or manually, wherein the composite fibers may be comprised in at least one of a filament, a roving, a tow, a woven non-crimp fabric, a thermoplastic tape, a prepreg and a towpreg.

According to an aspect the second part and/or the carrier part is formed by a heat resistant material. It may e.g. be formed by a heat resistant plastic, or a metal or by a heat resistive composite material.

According to an aspect the method is carried out entirely automatically by machines or robots. Machines may e.g. both apply the composite fibers to the carrier, bring it to the press tool, arrange it on the press tool and then remove it from the press tool when curing of the composite fibers is complete.

The composite fibers may be applied in the shape of individual strands, or they may be applied in a woven composite fiber fabric such as a rowing which is either pre-impregnated with a resin or not. Other suitable forms of the composite fibers are of course possible and within the scope of the invention, such as SMC (sheet moulding compound or BMC (bulk moulding compound).

According to an aspect the method comprise cooling the carrier part after removal from the press tool, and continuing heating the press tool for subsequent reception of at least one other carrier part comprising composite fibers.

This may ensure that production rate for producing the composite fiber product is kept at high speed since the press tool does not have to be cooled down between curing which would have been necessary of no carrier part was used.

According to an aspect the step of arranging could be performed in two or more parallel stations and be cured in one and the same press tool. If for instance the step of arranging the composite fibers on the carrier is the step that takes the longest time, it could be performed in two or more parallel steps and cured in one and the same press tool to achieve a continuous use of the press tool.

According to an aspect the method comprises storing the carrier part with the applied non-cured composite fiber part during a period of time before it is arranged in the press tool.

Hence manufacturing may e.g. comprise producing the pre-forms and applying the composite fibers to them. The pre-forms comprising the composite fibers may then e.g. be stored in a ware house, or shipped to another location. Curing of the composite fibers could then be carried out on a later date and possibly in an entirely different location. This way make it possible to purchase or obtain a large amount of pre-forms already prepped with composite fibers which then can be cured by use of e.g. an assembly line procedure in order to perform the curing of multiple preforms as quick and efficient as possible.

According to an aspect the carrier part comprise cured composite fibers.

According to an aspect the composite fiber part and the carrier part after the step of removal from the press tool is used as the carrier part in a step of repeating the method of producing a composite fiber part, such that it comprise two or more composite fiber parts and a second part. By such a method products can be produced that has complicated shapes in an efficient way. Further, products can be produced in several steps by using the output from one method step as the input for the next method step. In this way complicated shaped can be achieve by using the produced combination of a composite fiber part and a second part as the second part when repeating the method and build up the finished product in steps.

According to an aspect the carrier part has a rotational symmetrical shape and the step of applying comprise rotating the carrier part and/or the composite fiber part.

According to an aspect the step of applying comprise applying the composite fiber part such that at least some of the fibers of the composite fiber part completely encircles the carrier part. This will obtain a product that is really strong as the fibers encircles the rotational symmetrical shape of the second part.

According to an aspect the finished product is a rim of a vehicle and wherein second part is one or more of a hubcap, a spoke, a barrel, an inner barrel and an outer barrel of the rim. By producing rims for a vehicle according to this the production costs can be reduced. If the weight of the rim is lowered, this will have a big impact on the energy consumption of the vehicle as the mass of the rim rotates.

A second aspect is a composite fiber product comprising a composite fiber part and a second part. The second part comprises a carrier part, wherein the carrier part is a replica of a press tool configured to be heated and to apply a pressure. The composite fiber part is arranged on the carrier part, wherein the carrier part and the composite fiber part are configured to be arranged on the press tool. Heat and pressure is applied via interaction of the press tool and the carrier part, to the composite fiber part and the carrier part such that the composite fiber part is cured. The carrier part comprising the composite fiber part is configured to be removed from the press tool, and after removal from the press tool the composite fiber part and the carrier part are configured to constitute together at least a part of a finished product.

According to an aspect the composite fiber part is configured to be fixedly connected to the carrier part by the curing of the composite fiber part.

According to an aspect the composite fiber part is configured to be applied to the carrier part automatically or manually, and wherein the composite fiber part comprise at least one of a filament, a roving, a tow, a woven non-crimp fabric, a thermoplastic tape, a prepreg and a towpreg.

According to an aspect the carrier part is formed of a heat resistant material.

According to an aspect the carrier part is configured to be cooled after removal from the press tool, and wherein the press tool is configured to be kept heated for subsequent reception of at least one other carrier part comprising composite fibers According to an aspect the composite fiber product comprise one or more of a glass fiber, a carbon fiber, a aramid fiber, a basalt fiber, a natural fiber, a flax fiber and a hemp fiber, or similar.

According to an aspect the carrier part comprise cured composite fibers.

According to an aspect the composite fiber product comprise two or more composite fiber parts, each produced according to the method according to the above.

According to an aspect the carrier part has a rotational symmetrical shape.

According to an aspect at least some of the fibers of the composite fiber part completely encircles the carrier part.

According to an aspect the finished product is a rim of a vehicle and wherein second part and/or the composite fiber part is one or more of a hubcap, a spoke, a barrel, an inner barrel and an outer barrel of the rim.

A third aspect is use of a composite fiber product according to any of the above aspects.

In some embodiments, the second and third aspects may additionally have features identical with, or corresponding to, any of the various features as explained for the first aspect.

An advantage of some embodiments is that great flexibility may be achieved in terms of producing composite fiber products.

Another advantage of some embodiments is that assembly of the final product comprising the composite fiber product is simplified.

Another advantage of some embodiments is that composite fiber products may be easily customized to fit several different products and/or applications.

BRIEF DESCRIPTION OF THE DRAWINGS

Further objects, features and advantages will appear from the following detailed description of embodiments, with reference being made to the accompanying drawings, in which.

DETAILED DESCRIPTION

Figure 1:
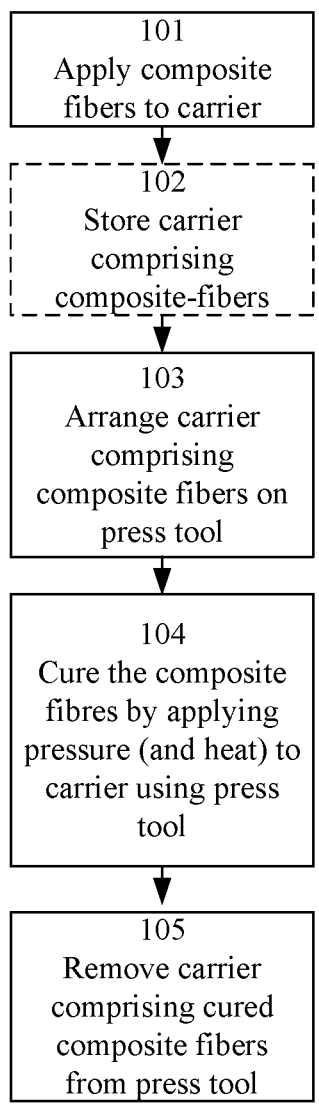
FIG. 1 is a flowchart illustrating example method steps according to some aspects of the invention.

The present invention will now be described more fully hereinafter with reference to the accompanying drawings, in which exemplary embodiments and aspects of the invention are shown. The invention may, however, be embodied in many different forms and should not be construed as limited to the embodiments and aspects set forth herein; rather, these embodiments and aspects are provided for thoroughness and completeness. Like reference characters refer to like elements throughout the description. The drawings are not necessarily to scale and certain features may be exaggerated in order to better illustrate and explain the exemplary embodiments of the present invention.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In some implementations and according to some aspects of the disclosure, the functions or steps in the method can occur out of the order noted in the operational illustrations. For example, two steps shown in succession can in fact be executed substantially concurrently or the steps can sometimes be executed in the reverse order, depending upon the functionality/acts involved.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In the following, embodiments and aspects will be described where manufacturing and/or production of composite fiber products is made flexible and efficient. Composite fibers are fibers that are flexible and/or elastic fibers and that can be cured to a fixed state when cured by applying pressure and/or heat to the fibers.

Composite fibers according to an aspect comprise one or more of a glass fiber, carbon fiber, aramid fiber, basalt fiber, natural fiber, organic or non-organic fibers. Composite fibers are according to an aspect used together with a resin/matrix that connects the composite fiber to another composite fiber. According to an aspect the resin/matrix will also be a part of the finished product. According to an aspect the resin/matrix is heated when applied to the fibers to become sticky or adhesive.

One type of composite fibers is carbon fibers. Carbon fibers (sometimes also denoted as CF, graphite fiber or graphite fibre) are fibers that typically have a diameter about 5-10 micrometres being mainly composed of carbon atoms. Carbon fibers typically have several advantages such as e.g. high stiffness, high tensile strength, low weight, high chemical resistance, high temperature tolerance and low thermal expansion. These properties have made the use of carbon fiber very popular in fields such as aerospace, civil engineering, military, and motorsports, along with other competition sports. However, they are typically associated with a higher production cost when compared with similar fibers, such as glass fibers or plastic fibers.

To produce a composite fiber filament, the composite atoms are typically bonded together in crystals that are more or less aligned parallel to the long axis of the fiber. The crystal alignment typically gives the fiber a high strength-to-volume ratio. Typically, several thousand of composite fibers filaments are bundled together to form a tow, which may be used by itself or woven into a fabric.

Composite fiber filament may also be arranged into a composite fiber filament yarn. These yarns may be used in several processing techniques. The direct use may typically be for prepregging (pre-impregnating the yarn with a resin), filament winding, pultrusion, weaving, braiding, etc. The yarn can then be used e.g. to weave a carbon fiber filament fabric or cloth. The appearance of this fabric generally depends on the linear density of the yarn and the weave chosen. Some commonly used types of weave are twill, satin and plain. Composite filament yarns may also be knitted or braided or as UD-tape.

Composite fibers are usually combined with other materials. When impregnated with a resin/matrix, it becomes a prepreg which when heated forms a composite-fiber-reinforced polymer (often referred to as composite fibre) which has a very high strength-to-weight ratio, and is extremely rigid although somewhat brittle.

Hence, composite fibers are a versatile material which is applicable in a wide range of uses and areas. However, common for all uses is that the composite fibers will have to be formed into a desired shape, and then cured in order to obtain maximum durability.

FIG. 1 illustrates a method 100 for producing a product 200, 300, 400 comprising a composite fiber part 202, 402 and a second part 201, 401. The second part 201, 401 comprise a carrier part 203, wherein the carrier part 203 is a replica of a press tool 301*a*, 301*b*. The press tool 301*a*, 301*b* is configured to be heated and to apply a pressure.

The method 100 starts in 101 where the composite fiber part 202, 402 is applied on the carrier part 203 of the second part 201, 401. According to an aspect the composite fiber part 202, 402 is applied by applying one or more layers of composite fibers to build up the composite fiber part 202, 402 on the carrier part 203.

There are several different ways the composite fibers may be applied. The composite fibers may e.g. be applied manually (e.g. by a person) or automatically (e.g. by a robot). The composite fibers may be applied on individual basis, i.e. applied as individual filaments. This may e.g. be beneficial if a product needs to be customized in a special way. It may e.g. be crucial to some products that the filaments are applied with different orientation or in several layers depending on the shape and purpose of the intended product. If the composite fibers are applied in e.g. a tow, or a whole sheet of prepreg fibers, it may be difficult to achieve the desired customization.

Furthermore, in some embodiments, the composite fibers may be comprised in at least one of a filament, a roving, a tow, a woven non-crimp fabric, a thermoplastic tape, a prepreg (pre impregnated) and a towpreg.

If the composite fibers are in the shape of a filament, they may (as described above) be applied individually. If the composite fibers are comprised within a roving, tow, woven non-crimp fabric, thermoplastic tape, prepreg or towpreg that composite fibers may be applied in the form of a sheet 204, see e.g. FIG. 2.

The step of applying the composite fiber part 202, 402 to the carrier 203 part may be followed by step 102, in which the the carrier part 203 with the applied composite fiber part 202, 402 are stored during a period of time before it is put in the press tool 301*a*, 301*b*.

This step is not compulsory for the method 100 as indicated by the dashed lines of 102. However, it may be that one company or operator produces the second part 201, 401 comprising the carrier part 203 and applies composite fibers to the carrier part to build up the composite fiber part 202, 402, and another company or operator receives the second part and the carrier part with the applied composite fibers and arranges, as described in step 103, the carrier 203 and the composite fiber part 202, 402 on the press tool 301*a*, 301*b*.

In step 103 the product 200, 300, 400 is arranged in the press tool 301*a*, 301*b*. The carrier part 203 and the non-cured composite fiber part 202, 402 is arranged such that the press tool 301*a*, 301*b* interacts with the carrier 203 and the non-cured composite fiber part 202, 402.

It is to be noted that when performing the method 100, the steps 101, 102 and 103 may be performed by the same company or operator in a subsequent manner, in the same manner steps 101 and 103 may be performed subsequently without step 102, by the same company or operator. The steps 101, 102 and 103 may also be performed by different companies or operators.

When the carrier 203 comprising the composite fibers part 202, 402 has been arranged on the press tool in step 103 the method continues in the curing step 104 where the composite fiber part 202, 402 is cured. The composite fiber part 202, 402 is cured via interaction of the press tool 301a, 301b and the carrier part 203. Heat and pressure are applied to the composite fiber part 202, 402 such that the composite fibers are cured.

The heat can be applied directly from the press tool 301a, 301b or via a separate heat source such as induction, microwave or laser.

The amount of heat and pressure that is needed to cure the composite fibers of the composite fiber part 202, 402 may vary based on the type of product being produced as well on what type of composite fibers that has been used. I.e. heat and pressure may vary if the composite fibers were applied e.g. in the shape of a rowing, non-crimp fabric, towpreg or prepreg, individual filament or the like.

In 105 of the method 100 the carrier part 203 and the cured composite fiber part of the product 200, 300, 400 is removed from the press tool 301a, 301b, wherein after removal from the press tool 301a, 301b the composite fiber part 202, 402 and the carrier part 203 constitutes together at least a part of the finished product 200, 300, 400.

In some embodiments, the composite fiber part 202, 402 may be fixedly connected to the carrier part 203, 403 after curing. During curing the composite fiber part 202, 402 change its stiffness from a flexible material to a hard and stiff material. The dimensions of the composite fiber part 202, 402 are used to connect the composite fiber part 202, 402 to the second part 201, 401. According to an aspect the heat and pressure is used to connect the composite fiber part 202, 402 to the second part 201, 401. According to an aspect an additional layer could be arranged between the composite fiber part 202, 402 and the carrier part 203 and be used to connect the composite fiber part 202, 402 to the second part 201, 401.

Thus, according to the method 100 the second part 201, 401, and thus also the carrier part 203, and the composite fiber part 202, 402, in the form of the applied composite fibers, together constitutes the finished product 200, 300, 400 which may later be used as a part for another final product, as disclosed in FIG. 4. In other words, contrary to traditional techniques, the pre-mold (in the form of the carrier part 203, 403) is not removed from the cured composite fibers. This opens up possibilities in terms of design of products. Up until now, composite products have typically been applied on a pre-mold for curing in a manner that needs to allow them to be removed from the carrier after curing. However, according to aspects of the current invention, care does not have to be taken when applying the composite fibers to the carrier in order to be able to remove the composite fibers from the carrier after curing.

According to an aspect there is a desire that the carrier and the composite fiber part are fixedly connected during manufacture.

For example, according to some embodiments, the composite fibers when being applied to the carrier part may e.g. be folded over the edges of the carrier, or even completely enveloping the entire carrier part.

According to an aspect it may be that only a part of the second part 200, 300, 400 is subjected to composite fibers (i.e. composite fibers are applied to at least a part of the carrier part 203 or that the pre mold part 203 constitutes a part of the second part 201, 401). Some applications may e.g. require that the product 200, 300, 400 retains the durability and strength of composite fibers only on a certain part which may be subjected to forces, but is not necessary to cover the entire product in composite fiber, this may also typically save costs when manufacturing composite fiber products.

According to an aspect the method 100 further comprise that the carrier part 203 may be cooled after removal from the press tool 301a, 301b, and that the press tool 301a, 301b is kept heated for subsequent reception of at least one other carrier part 203 comprising an applied composite fiber part 202, 402.

This ensures that production rate of cured products 200, 300, 400 comprising a cured composite fiber part 202, 402 and a second part 201, 401 is kept as high as possible since the press tool 301a, 301b does not have to be cooled down between curing due to the use of the carrier part 203.

According to an aspect the step of arranging could be performed in two or more parallel stations and be cured in one and the same press tool 301a, 301b. If for instance the step of arranging the composite fibers on the carrier part 203, 403 is the step that takes the longest time, it could be performed in two parallel steps and cured in one and the same press tool 301a, 301b to achieve a continuous use of the press tool 301a, 301b.

Figure 2A:
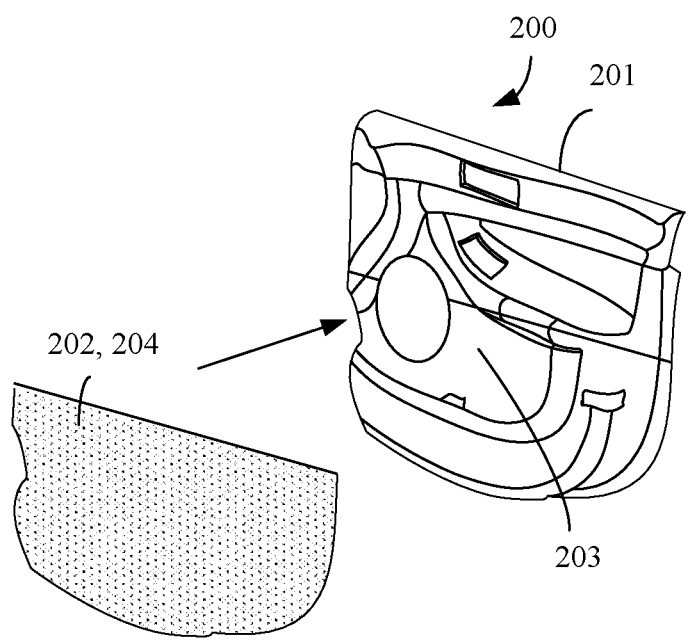
FIG. 2a is a schematic drawing illustrating a carrier before appliance of the composite fiber part according to some aspects.

FIG. 2a illustrates the carrier part 203 of the second part 201 and the composite fiber part 202 according to an aspect. The carrier part 203 is illustrated as being in the shape of a part of an inside of a car door 200. Other shapes are of course possible and depend on the intended final use of the product 200. The composite fiber part 202 is illustrated as being a sheet of woven composite fibers, e.g. a prepreg. It is to be understood that the shape of the pre-form and composite fibers are illustrated as an example, and that other shapes are possible.

FIG. 2a illustrates the carrier part 203 of the second part 201 before the composite fiber part 202 in the form of one or more layers of composite fibers has been applied. In some embodiments, the carrier part 203 may be formed by a heat resistive material. The carrier part may e.g. be formed by a heat resistive plastic, metal, or other suitable composite material.

Figure 2B:
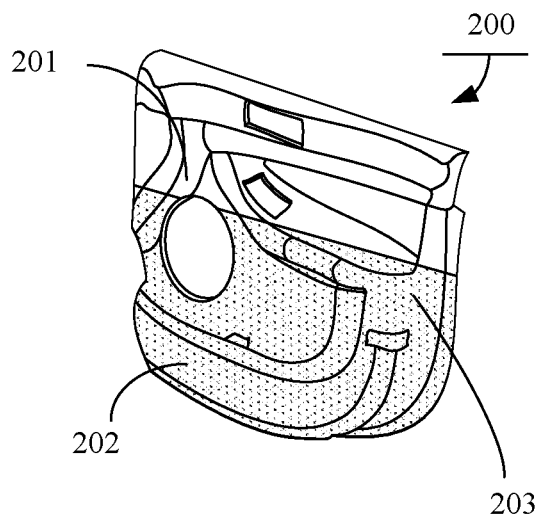
FIG. 2b is a schematic drawing illustrating a carrier after the appliance of composite fiber part according to some aspects.

In FIG. 2b the composite fibers 202 has been applied to the carrier part 203 and together they form the product 200 comprising the second part 201 and the composite fiber part 202 (compare with step 101 of the method 100). At this stage, the composite fibers of the composite fiber part 202 have not yet been cured. The product 200 may be stored (compare with step 102 of the method 100) for a period of time in order to later be arranged on a press tool 301a, 301b and cured.

Figure 3:
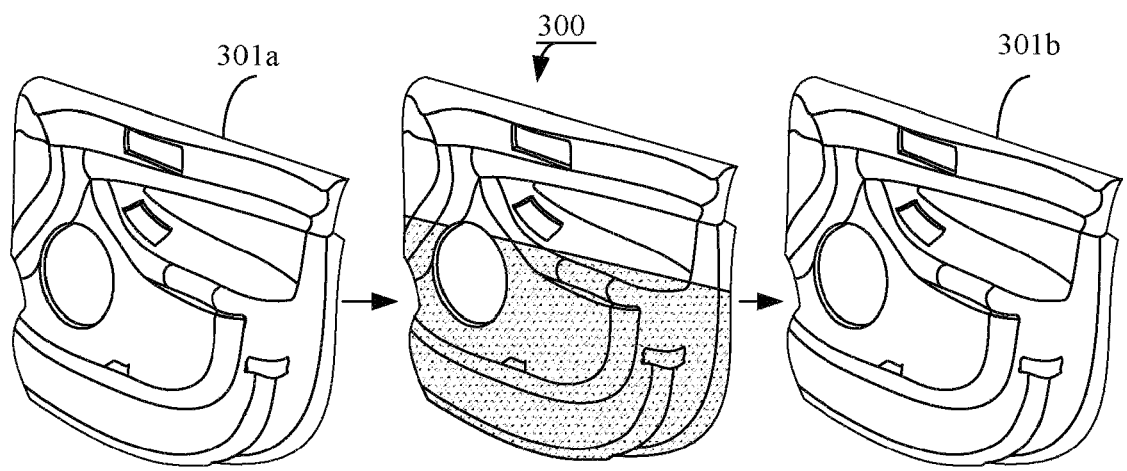
FIG. 3 is a schematic drawing illustrating how the carrier is arranged on the press tool according to some aspects.

FIG. 3 illustrates the press tool 301a, 301b and a product 300 arranged between the two parts of the press tool 301a, 301b according to some aspect. The product 300 comprising the composite fiber part may e.g. be the product 200 described in conjunction with any of the FIGS. 1 and/or 2, and the press tool 301a, 301b may e.g. be the press tool as described in conjunction with any of the FIGS. 1 and/or 2.

In FIG. 3 the composite fiber product 300 is arranged on top of the press tool 301b. When the composite fiber product 300 has been satisfactorily put in place, a second part of the press tool 301a will press down on the composite fiber part 300 applying pressure (compare with step 104 of the method 100) to the composite fiber product 300 while being heated. The heat and pressure from the press tool 301a, 301b will result in the curing of the composite fibers of the composite fiber part 202, 402 applied on the carrier part. When the curing is done, the product 300 is removed from the press tool (compare with step 105 of the method 100) and the composite fiber part 202, 402 together with the carrier part 203 of the second part 201, 401 will form part of a finished product.

Figure 4:
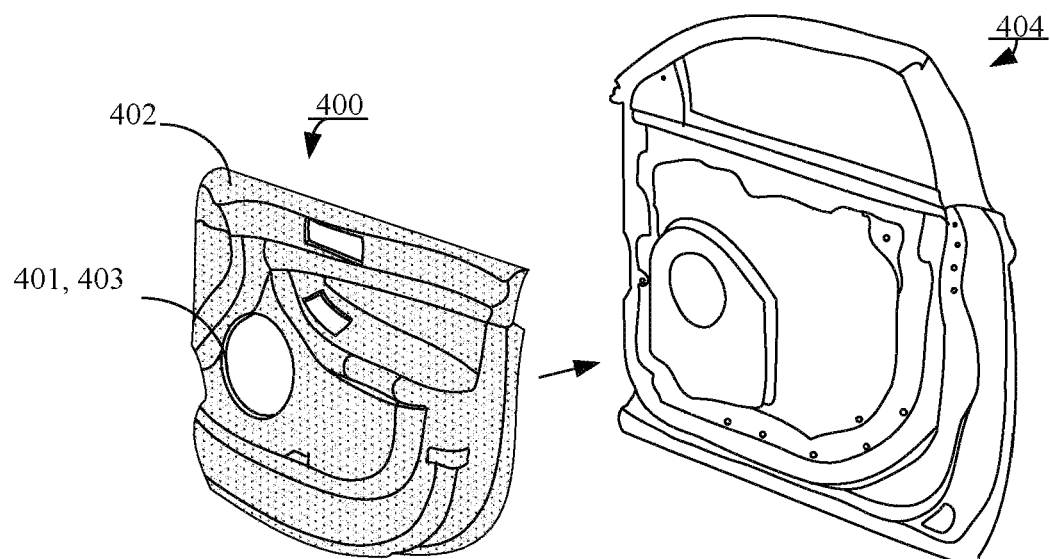
FIG. 4 is a schematic drawing illustrating a carrier with cured composite fibers according to some embodiments.

FIG. 4 illustrates a composite fiber product 400 comprising a composite fiber part 402 and a second part 401 according to some aspects. The product 400 comprising the composite fiber part 402 and the second part 401 may e.g. be the composite fiber product comprising a composite fiber part and a second part as previously described in conjunction with any of the FIGS. 1-3.

The second part 401 comprises the carrier part 403 which in FIG. 4 is illustrated as the inside of a car door. In the disclosed aspect the shape of the carrier part 403 is the same as the second part 401. The carrier part 401 is a replica of a press tool (e.g. the press tool 301a, 301b as described in FIG. 3) configured to be heated and to apply a pressure. The carrier part 401 is configured to having applied thereon composite fibers 402 (compare with step 101 of the method 100 and FIGS. 2a and 2b).

The carrier part 401 comprising the composite fiber part 402 is configured to be arranged on the press tool 301a, 301b, wherein heat and pressure is applied via interaction of the press tool and the carrier part 401, to the composite fibers part 402 and the carrier part 401 such that the composite fibers part 402 is cured (compare with step 104 of the method 100).

The carrier part 401 comprising the composite fibers part 402 is configured to be removed from the press tool (compare with step 105 of the method 100), wherein after removal from the press tool the composite fibers 402 and the carrier part 401 are configured to constitute together at least a part 400 of a finished product 404.

According to an aspect, the composite fiber part 402 are configured to be applied to the carrier part automatically or manually, and the composite fibers may be comprised in at least one of a filament, a roving, a tow, a woven non-crimp fabric, a thermoplastic tape, a prepreg and a towpreg. According to an aspect, the composite fibers of the composite fiber part 402 are configured to be applied to the carrier part 401 automatically or manually to build up the composite fiber part 402, and the composite fibers may be comprised in at least one of a filament, a roving, a tow, a woven non-crimp fabric, a thermoplastic tape, a prepreg and a towpreg.

According to an aspect, the carrier part 403 may be configured to be formed by a heat resistant material, such as e.g. a heat resistant plastic, metal, or other suitable material.

According to an aspect, the carrier part 403 is configured to be cooled after removal from the press tool 301a, 301b, and the press tool 301a, 301b is configured to be kept heated for subsequent reception of at least one other carrier part comprising composite fibers.

According to an aspect, the composite fiber part 402 is configured to be fixedly connected to the carrier part 403 of the second part 401 after curing. Hence, after curing it may not be possible to remove the composite fiber part 402 from the carrier part 403 as they together form a composite fiber product 400.

According to an aspect, the finished product may then be installed in a final product. As illustrated in FIG. 4, the cured product 400 having the form of the inside of a car door may be attached to the exterior of a car door 404. The composite fiber product 400 enables quicker and more flexible assembly of the finished product (i.e. a finished car door) 404. This since up until now, production has typically meant applying composite fibers to a pre-mold and then curing the composite fibers. Upon curing, the composite fibers have been removed from the pre-mold which has been used again for curing more fibers. The cured and removed composite fibers have then been attached to another pre-mold prior to assembling them in the final product.

This means that assembly steps of a final product comprising the composite fiber product are significantly reduced according to some embodiments.

Thus, the embodiments disclosed herein provide a flexible and quick way of producing composite fiber products for subsequent assembly into a final product.

According to an aspect the composite fiber part 202, 402 is used to connect a third part to the second part 201, 401. The composite fibers is in the non-cured state further connected to the third part and when it is cured the third part is fixedly connected to the composite fiber part 202, 402 and the second part 201, 401. The third part is according to an aspect a bolt or a threaded part that could be used to connect a further part.

According to an aspect the carrier part comprise cured composite fibers.

According to an aspect the composite fiber part and the carrier part after the step of removal from the press tool is used as the carrier part in a step of repeating the method of producing a composite fiber part, such that it comprise two or more composite fiber parts and a second part. By such a method products can be produced that has complicated shapes in an efficient way. Further, products can be produced in several steps by using the output from one method step as the input for the next method step. In this way complicated shaped can be achieve by using the produced combination of a composite fiber part and a second part as the second part when repeating the method and build up the finished product in steps.

According to an aspect the carrier part has a rotational symmetrical shape and the step of applying comprise rotating the carrier part and/or the composite fiber part.

According to an aspect the step of applying comprise applying the composite fiber part such that at least some of the fibers of the composite fiber part completely encircles the carrier part. This will obtain a product that is really strong as the fibers encircles the rotational symmetrical shape of the second part.

According to an aspect the finished product is a rim of a vehicle and wherein second part is one or more of a hubcap, an attachment, a spoke, a barrel, an inner barrel and an outer barrel of the rim. By producing rims for a vehicle according to this the production costs can be reduced. If the weight of the rim is lowered, this will have a big impact on the energy consumption of the vehicle as the mass of the rim rotates.

According to an aspect the carrier part comprise cured composite fibers.

According to an aspect the composite fiber product comprise two or more composite fiber parts, each produced according to the method according to the above.

According to an aspect the carrier part has a rotational symmetrical shape.

According to an aspect at least some of the fibers of the composite fiber part completely encircles the carrier part.

According to an aspect the finished product is a rim of a vehicle and wherein second part and/or the composite fiber part is one or more of a attachment, a hubcap, a spoke, a barrel, an inner barrel and an outer barrel of the rim.

According to an aspect the method is used to produce a rim for a vehicle. In a first step the method is used to produce a product where the second part is an attachment of the rim to the vehicle and the composite fiber part are the side or spokes of the rim. After the product is produced according to aspects of the method, the connected attachment and side or spokes is used as the second part when the steps of producing is repeated together with a new composite fiber part being the barrel of the rim. In this way the rim of composite fiber can be produced in steps. The design of the rim could be complex and use the strengths of composite fibers in an efficient way.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments and aspect, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method for producing a product comprising a composite fiber part and a second part, wherein the second part comprises a carrier part, wherein the carrier part is a replica of a press tool configured to be heated and to apply a pressure, comprising the steps of:
    applying, in a non-cured state, the composite fiber part on the carrier part;
    arranging the carrier part comprising the composite fiber part on the press tool;
    curing the composite fiber part on the carrier part; and
    removing the product from the press tool, wherein after removal from the press tool the composite fiber part and the carrier part constitutes together at least a part of the finished product; and
    wherein the composite fiber part and the carrier part after the step of removal from the press tool is used as the carrier part in a step of repeating the method of producing the product, such that it comprises two or more composite fiber parts and a second part.

2. The method according to claim 1, wherein the composite fiber part is fixedly connected to the carrier part after curing.

3. The method according to claim 1, wherein the step of applying comprises applying one or more layers of composite fibers on the carrier part to build up the composite fiber part on the carrier part.

4. The method according to claim 3, further comprising applying the composite fibers of the composite fiber part to the carrier part automatically or manually, wherein the composite fibers are comprised in at least one of a filament, a roving, a tow, a woven non-crimp fabric, a thermoplastic tape, a prepreg or a towpreg.

5. The method according to claim 1, wherein the step of curing comprises applying, via interaction of the press tool and the carrier part, heat and/or pressure to the composite fiber part.

6. The method according to claim 1, further comprising cooling the carrier part after removal from the press tool, and continuing heating the press tool for subsequent reception of at least one other carrier part comprising a composite fiber part.

7. The method according to claim 1, further comprising storing the carrier part with the applied non-cured composite fiber part during a period of time before it is arranged in the press tool.

8. The method according to claim 1, wherein the composite fiber part comprises one or more of a glass fiber, a carbon fiber, a aramid fiber, a basalt fiber, a natural fiber, a flax fiber, or a hemp fiber.

9. The method according to claim 1, wherein the carrier part comprises cured composite fibers.

* * * * *